United States Patent
Kobayashi et al.

(10) Patent No.: US 11,840,240 B2
(45) Date of Patent: Dec. 12, 2023

(54) ROAD CONDITION ESTIMATION APPARATUS, METHOD AND PROGRAM

(71) Applicant: NIPPON TELEGRAPH AND TELEPHONE CORPORATION, Tokyo (JP)

(72) Inventors: Kazunori Kobayashi, Tokyo (JP); Hiroaki Ito, Tokyo (JP); Shin Murata, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 37 days.

(21) Appl. No.: 17/617,254

(22) PCT Filed: Jun. 12, 2019

(86) PCT No.: PCT/JP2019/023229
§ 371 (c)(1),
(2) Date: Dec. 7, 2021

(87) PCT Pub. No.: WO2020/250332
PCT Pub. Date: Dec. 17, 2020

(65) Prior Publication Data
US 2022/0250626 A1    Aug. 11, 2022

(51) Int. Cl.
*B60W 40/068* (2012.01)
*G01C 21/36* (2006.01)

(52) U.S. Cl.
CPC ....... *B60W 40/068* (2013.01); *G01C 21/3691* (2013.01); *B60W 2420/54* (2013.01); *B60W 2552/40* (2020.02); *B60W 2556/45* (2020.02)

(58) Field of Classification Search
CPC .......... B60W 40/068; B60W 2552/40; B60W 2556/45; B60W 2420/54; G01C 21/3691
See application file for complete search history.

(56) References Cited

U.S. PATENT DOCUMENTS

| 2016/0221581 A1* | 8/2016 | Talwar | B60W 30/00 |
| 2019/0003852 A1* | 1/2019 | Paturle | G06F 16/29 |

(Continued)

FOREIGN PATENT DOCUMENTS

| JP | 2002243535 A | 8/2002 |
| JP | 2005115687 A | 4/2005 |

(Continued)

OTHER PUBLICATIONS

Road Bureau, Ministry of Land, Infrastructure, Transport and Tourism (2016) "Pavement Inspection Guidelines", Oct. 2016, pp. 9-10 with its translation generated by machine.

*Primary Examiner* — Behrang Badii
*Assistant Examiner* — Jay Khandpur

(57) ABSTRACT

A road condition estimation device 2 includes: a reception unit 21 that receives pieces of sensor information from automobiles respectively, each piece of sensor information including positional information that is information regarding a position at which an automobile travels, and spectral information obtained by converting an acoustic signal generated when the automobile travels at the position into information in a frequency domain; a first classification unit 22 that classifies the pieces of spectral information respectively for roads on which the automobiles travel, based on pieces of positional information included in the pieces of sensor information thus received; and an estimation unit 23 that estimates a condition of a road for each of the pieces of spectral information classified by the first classification unit.

7 Claims, 7 Drawing Sheets

(56) References Cited

U.S. PATENT DOCUMENTS

| | | | |
|---|---|---|---|
| 2019/0113927 A1* | 4/2019 | Englard | ............... G06N 5/046 |
| 2019/0137359 A1 | 5/2019 | Miyasaka et al. | |
| 2021/0364646 A1* | 11/2021 | Vasilyuk | ............... G04F 10/00 |

FOREIGN PATENT DOCUMENTS

| JP | 2006161677 A | 6/2006 |
|---|---|---|
| JP | 2008143508 A | 6/2008 |
| JP | 2017041159 A | 2/2017 |
| WO | 2018159397 A1 | 9/2018 |
| WO | 2018173631 A1 | 9/2018 |

* cited by examiner

ROAD CONDITION ESTIMATION APPARATUS, METHOD AND PROGRAM

CROSS-REFERENCE TO RELATED APPLICATIONS

This application is a U.S. National Stage Application filed under 35 U.S.C. § 371 claiming priority to International Patent Application No. PCT/JP2019/023229, filed on 12 Jun. 2019, the disclosure of which is hereby incorporated herein by reference in its entirety.

TECHNICAL FIELD

The present invention relates to a technique for estimating the condition of a road.

BACKGROUND ART

Grasping the condition of deterioration of road pavement is important for road pavement maintenance, and is regularly inspected. For example, at present, visual inspection is carried out by an expert, or inspection is carried out by using specialized measuring equipment.

CITATION LIST

Non Patent Literature

[NPL 1] Road Bureau, Ministry of Land, Infrastructure, Transport and Tourism, "Pavement Inspection Guidelines", October 2016, pp. 9-10

SUMMARY OF THE INVENTION

Technical Problem

However, the cost of conventional inspection carried out by an expert is high.

An object of the present invention is to provide a road condition estimation device, method, and program with which inspection cost is lower than that of conventional techniques.

Means for Solving the Problem

A road condition estimation device according to one aspect of the present invention includes: a reception unit that receives pieces of sensor information from automobiles respectively, each piece of sensor information including positional information that is information regarding a position at which an automobile travels, and spectral information obtained by converting an acoustic signal generated when the automobile travels at the position into information in a frequency domain; a first classification unit that classifies the pieces of spectral information respectively for roads on which the automobiles travel, based on pieces of positional information included in the pieces of sensor information thus received; and an estimation unit that estimates a condition of a road for each of the pieces of spectral information classified by the first classification unit.

Effects of the Invention

The condition of a road can be estimated at low inspection costs compared to conventional techniques.

DESCRIPTION OF EMBODIMENTS

Figure 1:
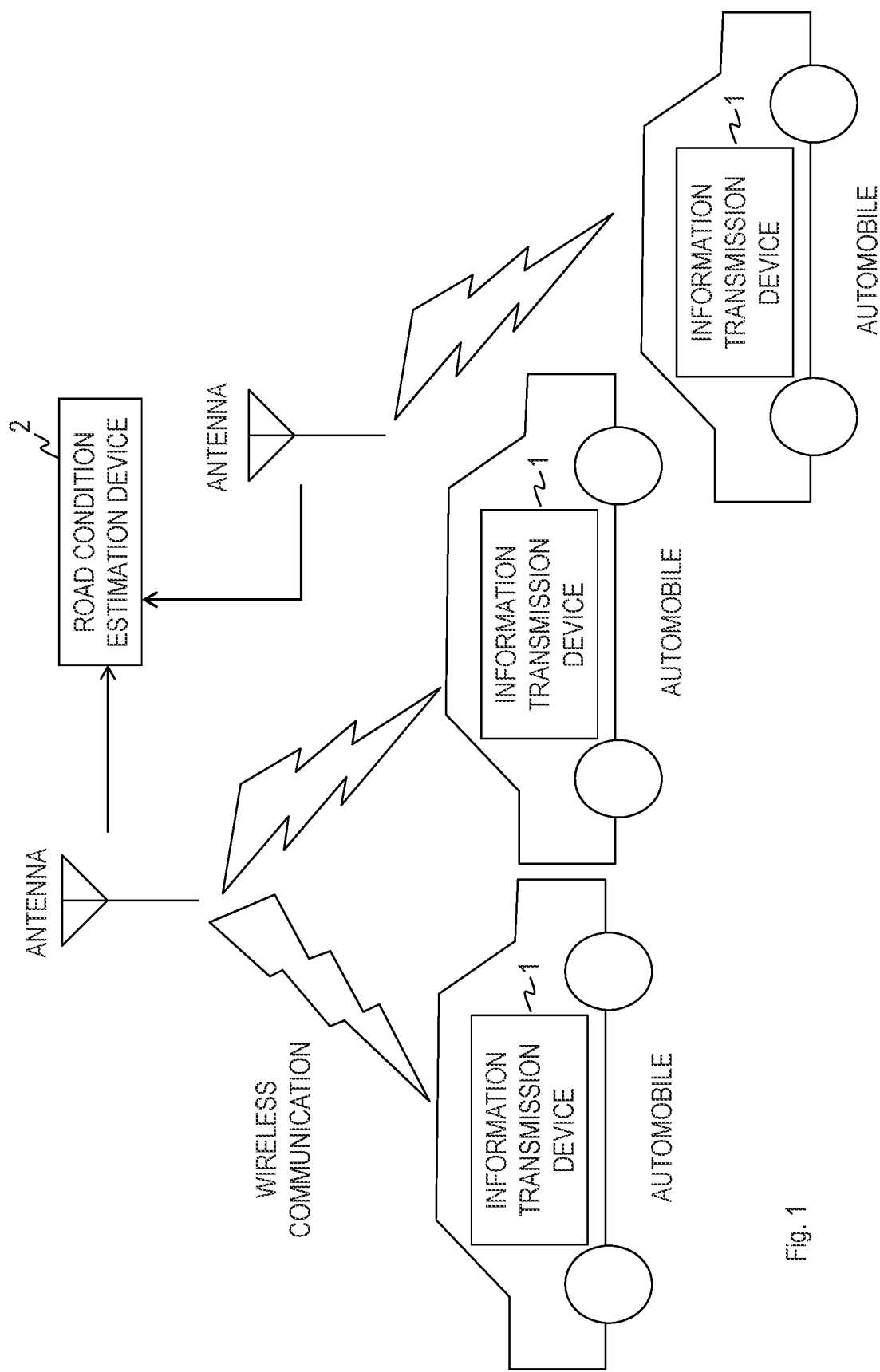
FIG. 1 is a diagram illustrating an outline of a road condition estimation system.

The following describes embodiments of the present invention in detail. Note that the same constituent units that have the same functions in the drawings are given the same numbers and duplicative descriptions are omitted.

First Embodiment

Currently, the number of vehicles that are connected to a mobile communication network is increasing due to communication devices such as smartphones owned by drivers and communication units that are installed as standard equipment of vehicles such as automobiles. In addition, communication devices and vehicles may be equipped with sensors such as a GPS, an accelerometer, a microphone, and a video camera. The road condition estimation device, method, and system use them to detect abnormalities of a road.

Figure 2:
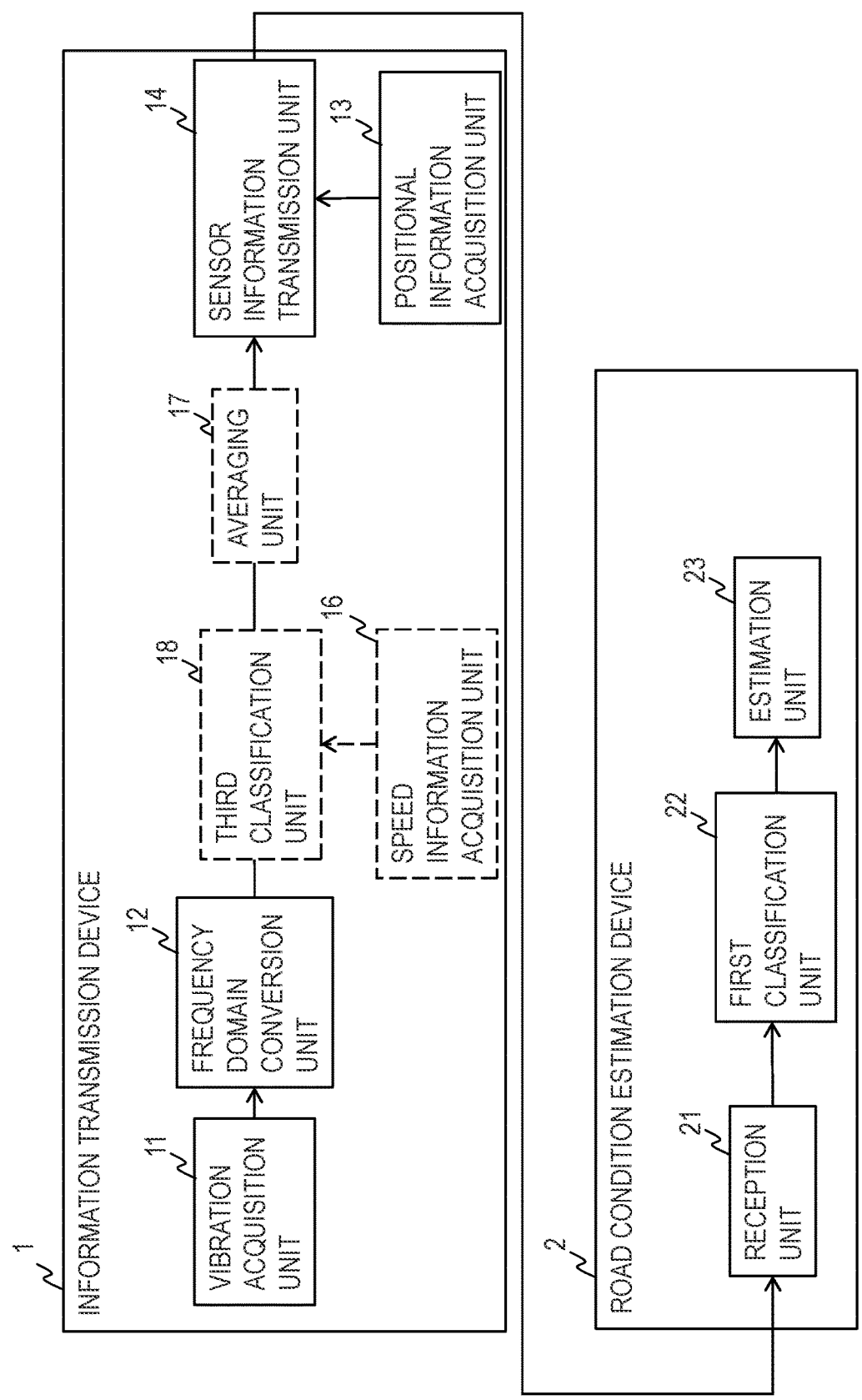
FIG. 2 is a diagram showing an example of a functional configuration of a road condition estimation system according to a first embodiment.

FIG. 2 is a diagram showing an example of a functional configuration of a road condition estimation system according to a first embodiment.

The road condition estimation system includes an information transmission device 1 and a road condition estimation device 2, for example.

Figure 3:
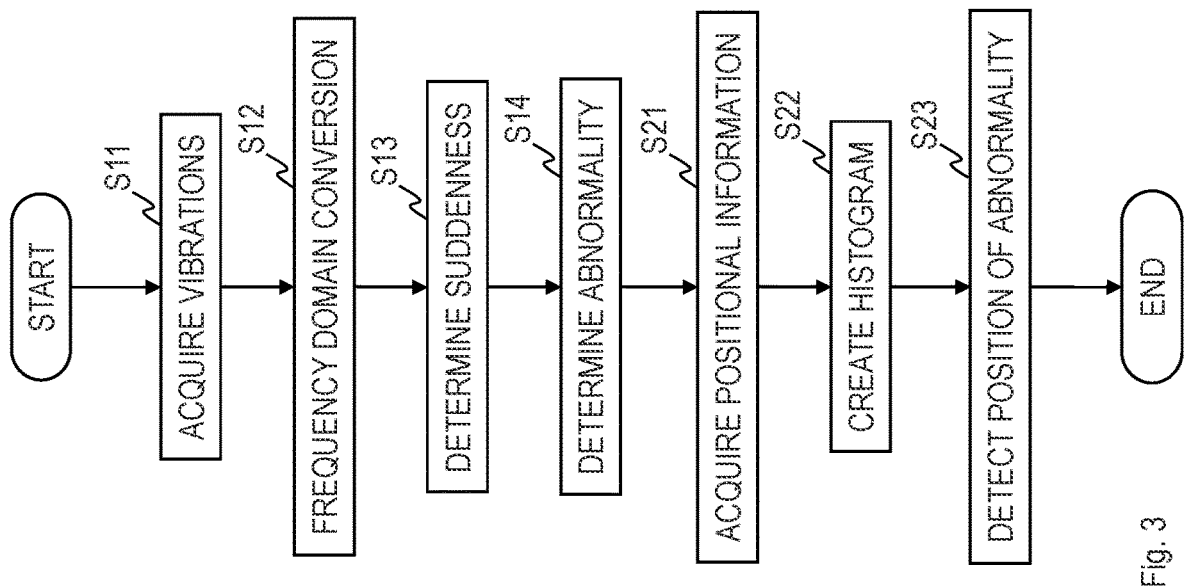
FIG. 3 is a diagram showing an example of a processing procedure of a road condition estimation method.

The road condition estimation method is realized by the constituent units of the road condition estimation device 2 performing the processing in steps S21 to S23 described below and shown in FIG. 3. The road condition estimation method is realized by the constituent units of the road condition estimation device 2 performing the processing in steps S11 to S23 described below and shown in FIG. 3.

[[Information Transmission Device 1]]

The information transmission device 1 includes a vibration acquisition unit 11, a frequency domain conversion unit 12, a positional information acquisition unit 13, and a sensor information transmission unit 14, for example.

<Vibration Acquisition Unit 11>

The vibration acquisition unit 11 acquires a vibration signal that is a signal indicating vibrations generated when an automobile travels on a road (step S11). The vibration acquisition unit 11 is a sensor that acquires a vibration signal, such as a microphone, a vibration sensor, or an acceleration sensor. A vibration signal may also be an acoustic signal that is a signal indicating vibrations of longitudinal waves of elastic bodies such as air, acquired by a microphone. The following describes an example in which the vibration signal is an acoustic signal.

The vibration signal acquired by the vibration acquisition unit 11 is output to the frequency domain conversion unit 12.

<Frequency Domain Conversion Unit 12>

The frequency domain conversion unit 12 acquires spectral information obtained by converting the acquired vibration signal (e.g., an acoustic signal) into information in the frequency domain (step S12). The acquired spectral information is output to the sensor information transmission unit 14.

<Positional Information Acquisition Unit 13>

The positional information acquisition unit 13 acquires positional information that is information regarding a position at which an automobile travels, and outputs the positional information to the sensor information transmission unit 14 (step S13). Positional information is GPS positional information, for example.

<Sensor Information Transmission Unit 14>

The spectral information acquired by the frequency domain conversion unit 12 and the positional information acquired by the positional information acquisition unit 13 are input to the sensor information transmission unit 14.

The sensor information transmission unit 14 transmits sensor information that includes positional information and spectral information to the road condition estimation device 2 (step S14).

[[Road Condition Estimation Device 2]]

The road condition estimation device 2 includes a positional information reception unit 21, a first classification unit 22, and an estimation unit 23, for example.

<Positional Information Reception Unit 21>

The positional information reception unit 21 receives the sensor information transmitted by the sensor information transmission unit 14 (step S21). The sensor information is output to the first classification unit 22.

<First Classification Unit 22>

The sensor information received by the positional information reception unit 21 is input to the first classification unit 22.

The first classification unit 22 classifies pieces of spectral information respectively for roads on which automobiles travel, based on pieces of positional information included in the pieces of sensor information received by the positional information reception unit 21 (step S22).

Specifically, the first classification unit 22 specifies roads on which automobiles travel, based on the pieces of positional information included in the pieces of sensor information thus received, and classifies the pieces of spectral information for the roads, respectively.

<Estimation Unit 23>

The pieces of spectral information classified by the first classification unit 22 for the roads are input to the estimation unit 23.

The estimation unit 23 estimates the respective conditions of the roads, based on the pieces of spectral information classified for the roads (step S23).

First, the estimation unit 23 averages, for each road, the pieces of spectral information classified for the road, and thus obtains an average spectrum for each road. Averaging is to be performed regarding a plurality of vehicles and a predetermined time interval. The predetermined time interval is a day, a month, or a year, for example. An average spectrum is obtained for each frequency band. Note that the estimation unit 23 may obtain an average spectrum for each road by performing averaging based on a mel frequency (a logarithmic frequency).

Next, the estimation unit 23 estimates the condition of each road based on the average spectrum of the road.

Figure 4:
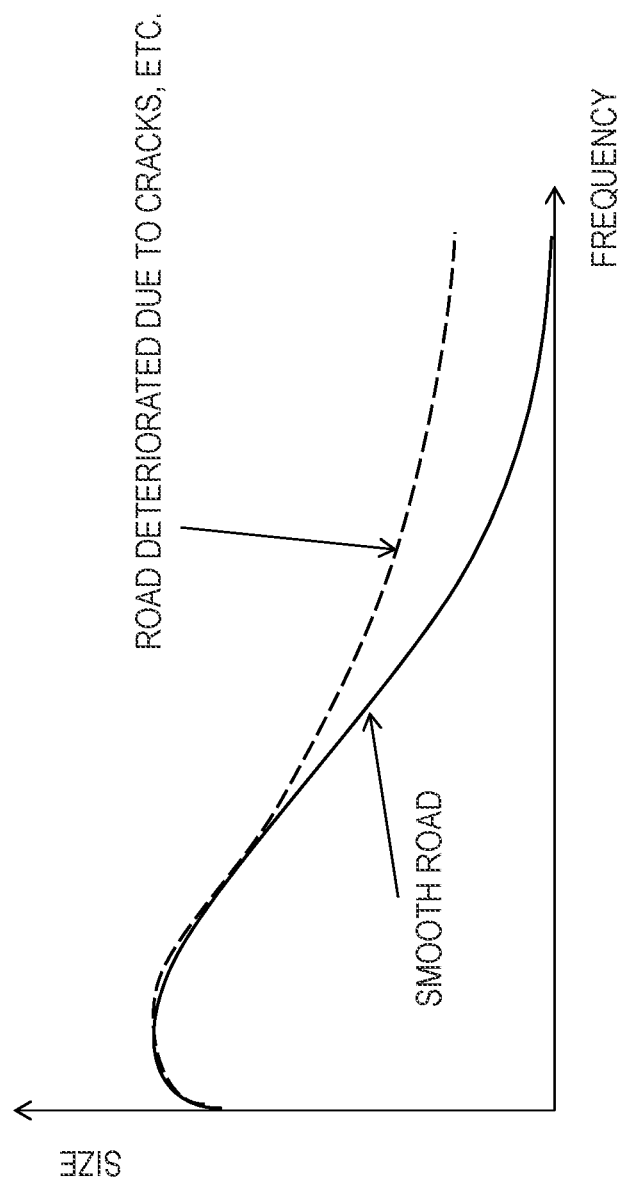
FIG. 4 is a diagram showing examples of spectral characteristics of noise of a travelling automobile.

FIG. 4 shows examples of spectral characteristics of the noise of a travelling automobile. Generally, high-frequency travel noise increases as the road surface deteriorates due to cracks or the like. The dashed line in FIG. 4 is a spectrum corresponding to a road deteriorated due to cracks or the like, and the solid line in FIG. 4 is a spectrum corresponding to a smooth road.

Therefore, for example, when the size of the average spectrum at a predetermined frequency (e.g., 1 kHz) or higher is greater than a predetermined threshold value, the estimation unit 23 can estimate that the road corresponding to the average spectrum is deteriorated.

Alternatively, for example, the estimation unit 23 may obtain the ratio between the size of the average spectrum at a predetermined first frequency (e.g., 500 Hz) or lower and the size of the average spectrum at a predetermined second frequency (e.g., 1 kHz) or higher, and determine that the road corresponding to the average spectra is deteriorated when the ratio is greater than a predetermined threshold value.

As described above, the estimation unit 23 may estimate the condition of a road based on the size of the average spectrum, or the inclination of the average spectrum.

Furthermore, the average spectrum of a road that is not deteriorated and the average spectrum of a road that is deteriorated are prepared, a neural network for distinguish between them is trained through machine learning, and a discriminator that can determine the presence or absence of deterioration is formed. In such a case, the estimation unit 23 may estimate the condition of a road by inputting an average spectrum to this discriminator.

Note that, instead of predetermined threshold being provided, the estimation unit 23 may hold an average spectrum obtained immediately after road maintenance, and estimate the condition of the road by calculating the amount of change from the average spectrum.

For example, the estimation unit 23 may convert the average spectrum of the noise of the travelling automobile immediately after maintenance and the average spectrum of the target to be estimated into values in units of decibels (dB), perform subtraction, and estimate the condition of the road based on whether or not the difference is greater than a predetermined threshold value. For example, if the difference is greater than the predetermined threshold value, it is possible to estimate that the road is deteriorated, and otherwise it is possible to estimate that the road is not deteriorated.

Through the above-described method, the deterioration of a road can be determined based on data regarding the noise of a general travelling vehicle, without an expert going to the site and performing measurement through visual inspection or by using a specialized device. Thus, the condition of a road can be estimated at low inspection costs compared to conventional techniques. Also, for example, the deterioration of all roads can be constantly monitored.

Second Embodiment

A road condition estimation device system according to a second embodiment is the road condition estimation system according to the first embodiment to which an automobile information setting unit 15 and a second classification unit 24 are added.

The following mainly describes differences from the road condition estimation system according to the first embodiment. Descriptions of the same components as in the first embodiment are omitted.

Figure 5:
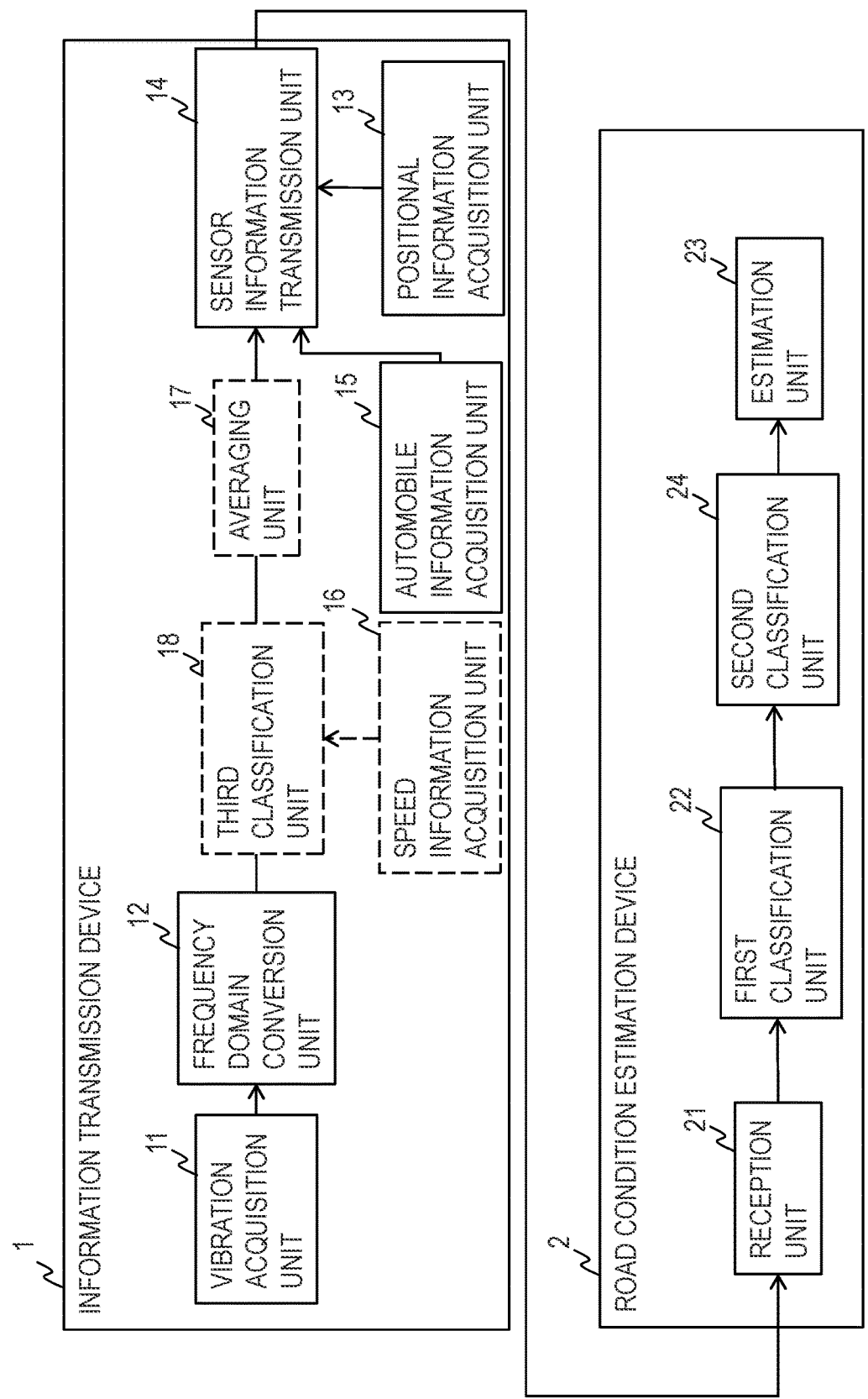
FIG. 5 is a diagram showing an example of a functional configuration of a road condition estimation system according to a second embodiment.

As illustrated in FIG. 5, the automobile information setting unit 15 is provided in the information transmission device 1, and the second classification unit 24 is provided in the road condition estimation device 2.

Automobile information that is information regarding an automobile is defined in the automobile information setting unit 15 in advance. In other words, automobile information is information regarding the characteristics of an automobile that affect the travel noise of the automobile, such as a vehicle weight, a wheelbase, a tire type, and so on.

The automobile information setting unit 15 transmits automobile information to the sensor information transmission unit 14.

The sensor information transmission unit 14 transmits sensor information that includes positional information, spectral information, and automobile information, to the road condition estimation device 2.

The pieces of spectral information classified by the first classification unit 22 for the roads are input to the second classification unit 24.

The second classification unit 24 further classifies the pieces of spectral information classified for the roads, for pieces of automobile information, respectively (step S24). The pieces of spectral information classified by the second classification unit 24 are output to the estimation unit 23.

The estimation unit 23 estimates the condition of a road for each of the pieces of spectral information classified by the second classification unit 24.

That is to say, the estimation unit 23 averages the spectra respectively classified for the roads and the pieces of automobile information, for each classification, to obtain an average spectrum for each classification based on the roads and the piece of automobile information. The processing to be performed thereafter is the same as in the first embodiment.

There are various sizes of vehicles such as trucks, buses, large passenger cars, and small passenger cars. Travel noise that can be observed differs greatly depending on such a type of the vehicle, and therefore, for example, it is possible to perform an accurate determination by averaging the spectra of travel noise for each type of vehicle, and determining the deterioration of the road.

Third Embodiment

The road condition estimation device system according to the third embodiment is the road condition estimation device system according to the first embodiment or the second embodiment to which a speed information acquisition unit 16 and a third classification unit 25 are added.

The following mainly describes differences from the road condition estimation system according to the first embodiment or the second embodiment. Descriptions of the same components as in the first embodiment or the second embodiment are omitted.

Figure 6:
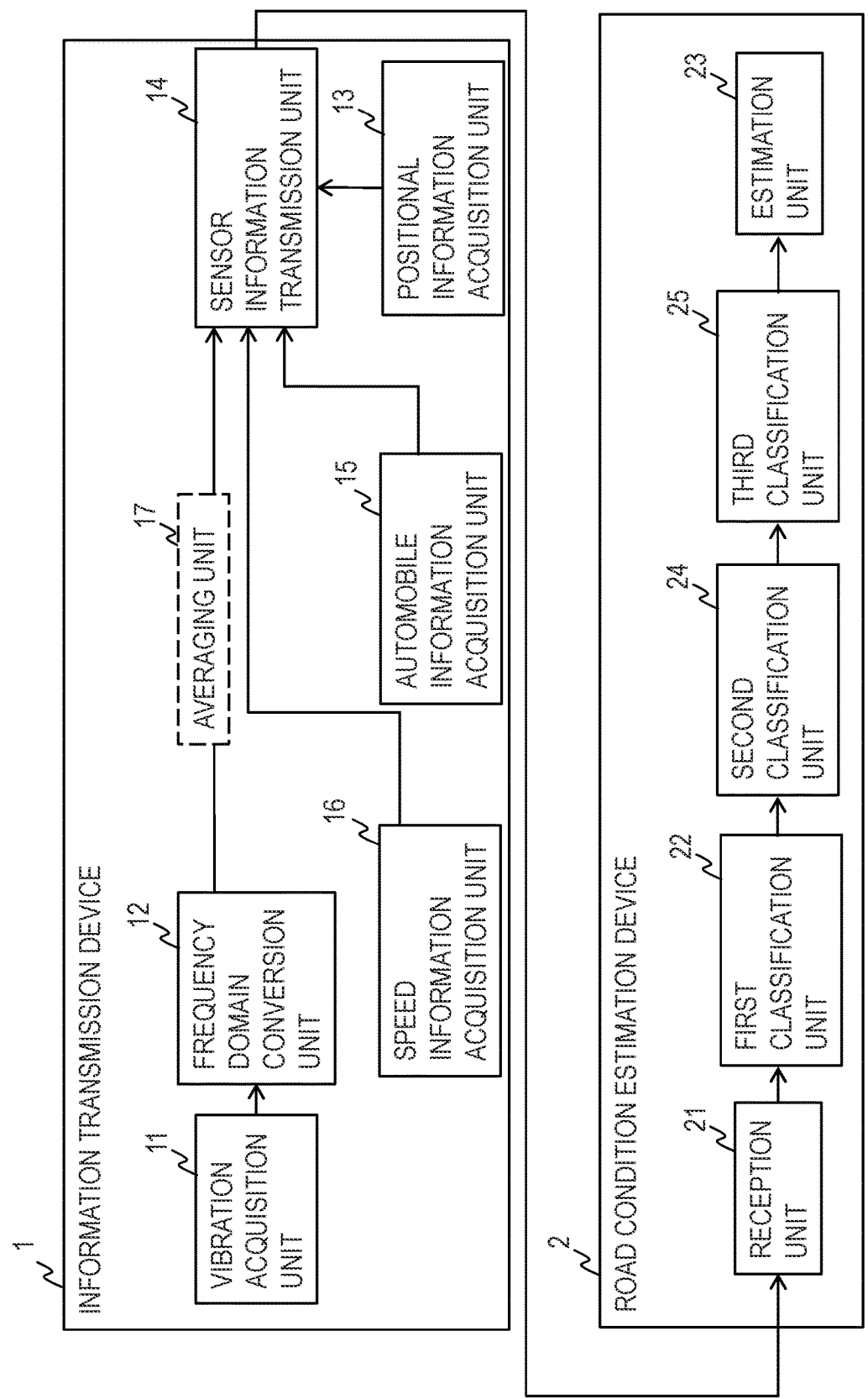
FIG. 6 is a diagram showing an example of a functional configuration of a road condition estimation system according to a third embodiment.

As illustrated in FIG. 6, the speed information acquisition unit 16 is provided in the information transmission device 1, and the third classification unit 25 is provided in the road condition estimation device 2. FIG. 6 is a diagram illustrating a road condition estimation system according to the third embodiment formed by adding the speed information acquisition unit 16 and the third classification unit 25 to the road condition estimation system according to the second embodiment.

The speed information acquisition unit 16 acquires speed information that is information regarding the speed of an automobile (step S16). For example, the speed information acquisition unit 16 can acquire speed information from a speedometer of an automobile. The acquired speed information is output to the sensor information transmission unit 14.

The sensor information transmission unit 14 transmits sensor information that includes positional information, spectral information, automobile information, and speed information, to the road condition estimation device 2.

The pieces of spectral information classified by the second classification unit 24 are input to the third classification unit 25.

The third classification unit 25 further classifies the pieces of spectral information classified by the second classification unit 24, for pieces of speed information, respectively (step S25). The pieces of spectral information classified by the third classification unit 25 are output to the estimation unit 23.

The estimation unit 23 estimates the condition of a road for each of the pieces of spectral information classified by the third classification unit 25.

That is to say, the estimation unit 23 averages the spectra respectively classified for the roads, the pieces of automobile information, and the pieces of speed information, for each classification, to obtain an average spectrum for each classification based on the roads, the piece of automobile information, and the pieces of speed information. The processing to be performed thereafter is the same as in the second embodiment.

Travel noise that can be observed differs greatly depending on the speed of the vehicle, and therefore, it is possible to perform an accurate determination by averaging the spectra of travel noise for each vehicle travel speed, and determining the deterioration of the road.

Note that if the speed information acquisition unit 16 and the third classification unit 25 are added to the road condition estimation system according to the first embodiment, the pieces of spectral information classified by the first classification unit 22 are input to the third classification unit 25.

If this is the case, the third classification unit 25 further classifies the pieces of spectral information classified by the first classification unit 22, for pieces of automobile information, respectively (step S25). The pieces of spectral information classified by the third classification unit 25 are output to the estimation unit 23. The subsequent processing is the same as above.

Fourth Embodiment

A road condition estimation device system according to a fourth embodiment is the road condition estimation system according to one of the first to third embodiments to which an averaging unit 17 is added.

The following mainly describes differences from the road condition estimation system according to the first to third embodiments. Descriptions of the same components as in the first to third embodiments are omitted.

As illustrated as dashed lines in FIGS. 2, 5, and 6, the averaging unit 17 is provided in the information transmission device 1, for example.

The spectral information acquired by the frequency domain conversion unit 12 is input to the averaging unit 17.

The averaging unit 17 time-averages the input spectral information. Time-averaging is performed within a time window of a predetermined time interval of several tens of seconds to several minutes, for example. The averaged spectral information is output to the sensor information transmission unit 14.

The sensor information transmission unit 14 transmits, as spectral information, sensor information that includes the spectral information averaged by the averaging unit 17, to the road condition estimation device 2. At this time, the sensor information transmission unit 14 transmits sensor information at predetermined time intervals. As a result, the reception unit 21 receives sensor information at predetermined time intervals. The predetermined time intervals may be the same as the length of the time window of the predetermined time interval within which the spectral information is time-averaged.

Thus, by lowering the frequency of transmission of sensor information, it is possible to lower the load on the communication network.

Fifth Embodiment

The road condition estimation device system according to the third embodiment is the road condition estimation device system according to the first embodiment or the second embodiment to which a speed information acquisition unit 16, an averaging unit 17, and a third classification unit 18 are added.

The following mainly describes differences from the road condition estimation system according to the first embodiment or the second embodiment. Descriptions of the same components as in the first embodiment or the second embodiment are omitted.

As illustrated in FIGS. 2 and 5, the speed information acquisition unit 16, the averaging unit 17, and the third classification unit 18 are provided in the information transmission device 1.

The speed information acquisition unit 16 acquires speed information that is information regarding the speed of an automobile (step S16). For example, the speed information acquisition unit 16 can acquire speed information from a speedometer of an automobile. The acquired speed information is output to the third classification unit 18.

The spectral information acquired by the frequency domain conversion unit 12 is input to the third classification unit 18.

The third classification unit 18 classifies the input pieces of spectral information for pieces of speed information, respectively (step S18). The pieces of spectral information classified by the third classification unit 18 are output to the averaging unit 17.

The averaging unit 17 time-averages the input spectral information. Time-averaging is performed within a time window of a predetermined time interval of several tens of seconds to several minutes, for example. The averaged spectral information is output to the sensor information transmission unit 14.

The sensor information transmission unit 14 transmits, as spectral information, sensor information that includes the spectral information averaged by the averaging unit 17, to the road condition estimation device 2. At this time, the sensor information transmission unit 14 transmits sensor information at predetermined time intervals. As a result, the reception unit 21 receives sensor information at predetermined time intervals. The predetermined time intervals may be the same as the length of the time window of the predetermined time interval within which the spectral information is time-averaged.

Thus, by lowering the frequency of transmission of sensor information, it is possible to lower the load on the communication network.

[Modifications]

Although the embodiments of the present invention have been described above, the specific configuration is not limited to these embodiments, and even if, for example, the design is changed according to the need without departing from the spirit of the present invention, such a configuration is included in the present invention as a matter of course.

The various kinds of processing described in the embodiments are not necessarily executed in chronological order as described, and may also be executed in parallel or individually depending on the processing capacity of the device that executes the processing or according to the need.

For example, data may be directly exchanged between the constituent units of the road condition estimation system, or via a storage unit (not shown).

Note that the conversion of an acoustic signal into information in a frequency domain may be performed by the road condition estimation device 2 instead of the information transmission device 1.

[Program and Recording Medium]

Figure 7:
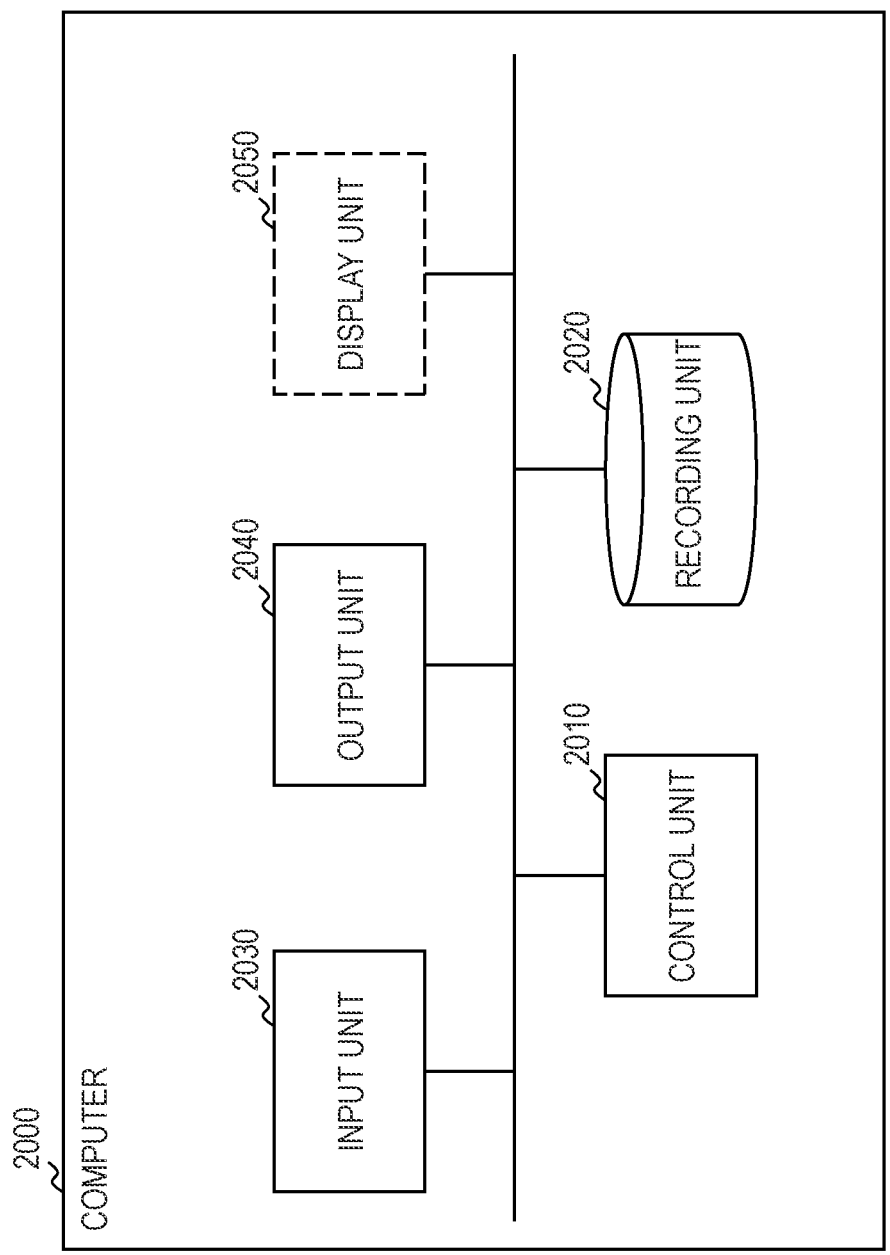
FIG. 7 is a diagram showing an example of a function configuration of a computer.

When the various processing functions of the above-described devices are realized using a computer, the content of processing to be performed through the functions of the devices is to be written in a program. A computer executes such a program, and the various processing functions of the above-described devices are realized on the computer. For example, the various kinds of processing described above can be carried out by causing a recording unit 2020 of the computer shown in FIG. 7 to read the program to be executed, to operate a control unit 2010, an input unit 2030, an output unit 2040, an optional display unit 2050, and so on.

A program in which the content of such processing may be recorded on a computer-readable recording medium. The computer-readable recording medium may be any kind of medium, such as a magnetic recording device, an optical disc, a photomagnetic recording medium, or a semiconductor memory.

In addition, the distribution of this program is carried out by, for example, selling, transferring, or renting a portable recording medium on which the program is recorded, such as a DVD or a CD-ROM. Furthermore, the program may be stored in a storage device of a server computer, and the program may be distributed by transferring the program from the server computer to another computer via a network.

A computer that executes such a program first stores, for example, a program recorded on a portable recording medium or a program transferred from a server computer, in its own storage device. Thereafter, when processing is to be executed, the computer reads out the program stored in its own storage device, and executes processing according to the program thus read out. In another mode of execution of this program, a computer may read out the program directly from a portable recording medium and execute processing according to the program. Furthermore, the computer may sequentially execute processing according to a received program every time a program is transferred from a server computer to the computer. In addition, it is possible to employ a configuration with which the above-described processing is performed through a so-called ASP (Application Service Provider) type service, which realizes processing functions only using an instruction to execute a program and the result of the acquisition, without transferring a program from a server computer to the computer. Note that the program in this mode includes information used for processing by a computer and equivalent to the program. An example thereof is data or the like that is not a direct command to the computer but has properties of defining the processing to be performed by the computer.

In addition, in this mode, the device is realized by executing a predetermined program on the computer. However, at least part of the content of such processing may be realized using hardware.

The invention claimed is:

1. A road condition estimation device comprising:
processing circuitry configured to:
receive pieces of sensor information from automobiles respectively,
wherein each piece of sensor information includes positional information and spectral information,
the positional information indicates a position of an automobile traveling on a road,
the spectral information is based on converting an acoustic signal into information in a frequency domain, and
the acoustic signal is generated when the automobile of the plurality of automobiles travels at the position;
classify the pieces of spectral information respectively for roads on which the automobiles travel, based on pieces of positional information included in the pieces of sensor information thus received; and
estimate, based at least on a size of spectrum of the spectral information at a frequency that is higher than a predetermined frequency threshold, a deterioration condition of a road for each of the pieces of spectral information classified by the processing circuitry, wherein the deterioration condition is associated with a need for repairing a road pavement at a location corresponding to the positional information.

2. The road condition estimation device according to claim 1,
wherein each piece of sensor information further includes automobile information that is information regarding an automobile,
the processing circuitry further configured to:
classify the pieces of spectral information classified by the processing circuitry, for pieces of automobile information, respectively; and
estimate the condition of a road for each of the pieces of spectral information classified for pieces of automobile information.

3. The road condition estimation device according to claim 1,
wherein each piece of sensor information further includes speed information that is information regarding a speed of an automobile,
the processing circuitry further configured to:

classifying the pieces of spectral information classified by the processing circuitry, for pieces of speed information, respectively; and
estimating the condition of a road for each of the pieces of spectral information classified for pieces of speed information.

4. The road condition estimation device according to claim 1,
wherein the pieces of spectral information respectively included in the pieces of sensor information received by the processing circuitry are pieces of averaged information, and
the processing circuitry further configured to receive the pieces of sensor information at predetermined time intervals.

5. The road condition estimation device according to claim 1,
wherein the pieces of spectral information respectively included in the pieces of sensor information received by the processing circuitry are averaged pieces of spectral information respectively classified for pieces of speed information that are each a piece of information regarding a speed of an automobile, and
the processing circuitry further configured to receive the pieces of sensor information at predetermined time intervals.

6. A road condition estimation method comprising:
a reception step receiving pieces of sensor information from automobiles respectively,
wherein each piece of sensor information includes positional information and spectral information,
the positional that is information indicates a position of an automobile traveling on a road,
the spectral information is based on converting an acoustic signal into information in a frequency domain, and
the acoustic signal is generated when the automobile of the plurality of automobiles travels at the position;
a first classification step classifying the pieces of spectral information respectively for roads on which the automobiles travel, based on pieces of positional information included in the received pieces of sensor information; and
an estimation step estimating, based at least on a size of spectrum of the spectral information at a frequency that is higher than a predetermined frequency threshold, a deterioration condition of a road for each of the pieces of spectral information, wherein the deterioration condition is associated with a need for repairing a road pavement at a location corresponding to the positional information.

7. A non-transitory computer readable medium that stores a program for enabling a computer to function as units included in the road condition estimation device according to claim 1.

* * * * *

UNITED STATES PATENT AND TRADEMARK OFFICE
CERTIFICATE OF CORRECTION

PATENT NO. : 11,840,240 B2
APPLICATION NO. : 17/617254
DATED : December 12, 2023
INVENTOR(S) : Kobayashi et al.

It is certified that error appears in the above-identified patent and that said Letters Patent is hereby corrected as shown below:

In the Claims

In Column 10, Line 32 of Claim 6, the text reading "that is" should be deleted.

Signed and Sealed this
Ninth Day of April, 2024

Katherine Kelly Vidal
*Director of the United States Patent and Trademark Office*